(12) United States Patent
Mathis

(10) Patent No.: US 7,353,038 B2
(45) Date of Patent: Apr. 1, 2008

(54) METHOD AND APPARATUS FOR INDICATING AN EXPECTED LEVEL OF QUALITY IN A PRIVATE PUSH TO TALK (PTT) NETWORK

(75) Inventor: James E. Mathis, Barrington, IL (US)

(73) Assignee: Mototola, Inc., Schaumburg, IL (US)

( * ) Notice: Subject to any disclaimer, the term of this patent is extended or adjusted under 35 U.S.C. 154(b) by 0 days.

(21) Appl. No.: 11/092,236

(22) Filed: Mar. 29, 2005

(65) Prior Publication Data
US 2006/0223562 A1 Oct. 5, 2006

(51) Int. Cl.
*H04B 7/00* (2006.01)
(52) U.S. Cl. .................. 455/518; 455/414.1; 455/517; 455/518; 455/519; 455/520
(58) Field of Classification Search .............. 455/517, 455/518, 519, 520
See application file for complete search history.

(56) References Cited

U.S. PATENT DOCUMENTS

| | | | | |
|---|---|---|---|---|
| 4,012,597 A | * | 3/1977 | Lynk et al. .................. 455/512 |
| 5,420,860 A | * | 5/1995 | Stevens et al. .............. 370/263 |
| 2003/0148779 A1 | * | 8/2003 | Aravamuden et al. ...... 455/519 |
| 2003/0223381 A1 | * | 12/2003 | Schroderus .................. 370/285 |
| 2005/0101339 A1 | * | 5/2005 | Bishop et al. ............... 455/521 |

* cited by examiner

*Primary Examiner*—Quochien B. Vuong
*Assistant Examiner*—Janelle N. Young
(74) *Attorney, Agent, or Firm*—Indira Saladi; Valerie M. Davis

(57) ABSTRACT

A method and apparatus for indicating an expected level of quality in a private Push To Talk (PTT) network are disclosed. The method and apparatus receive at least one of an affiliation message and a talkgroup call request for a first subscriber unit of the private PTT network wherein a talkgroup is associated with at least one of the private PTT network, another PTT network, and a public network. The method and system determine an expected level of quality for the talkgroup and send the determined expected level of quality to the subscriber unit.

20 Claims, 3 Drawing Sheets

METHOD AND APPARATUS FOR INDICATING AN EXPECTED LEVEL OF QUALITY IN A PRIVATE PUSH TO TALK (PTT) NETWORK

FIELD OF THE INVENTION

The present invention relates generally to wireless communication networks and in particular, to the field of radio communication networks providing private push to talk capability.

BACKGROUND OF THE INVENTION

Private Push-To-Talk (PTT) radio communication networks are designed for predictable and low delay performance and high voice quality. When a private PTT network is interconnected to one or more other networks, such as a public network or another private network, the predictable and low delay performance and high voice quality may degrade because delays from connecting to the one or more other networks may increase. Such degradation may increase if the private PTT network is interconnected over public carrier networks. In addition, a private PTT network that spans a large geographical area may include links to remote sites that have significant delays. In any case, a user of the private PTT network may not know whether a call that the user has placed spans multiple networks, encompasses high-delay links, or whether the call is only over the private PTT network. Thus, the user may be expecting the predictable and low delay performance and high voice quality that is expected of a private PTT network. Thus, when a private PTT network is interconnected to one or more other networks, there is a need to indicate the level of quality that the user can expect when placing a call.

Accordingly, there exists a need for a method and apparatus for indicating an expected level of quality in a Private Push to Talk (PTT) network.

BRIEF DESCRIPTION OF THE FIGURES

A preferred embodiment of the invention is now described, by way of example only, with reference to the accompanying figures in which.

Figure 1:
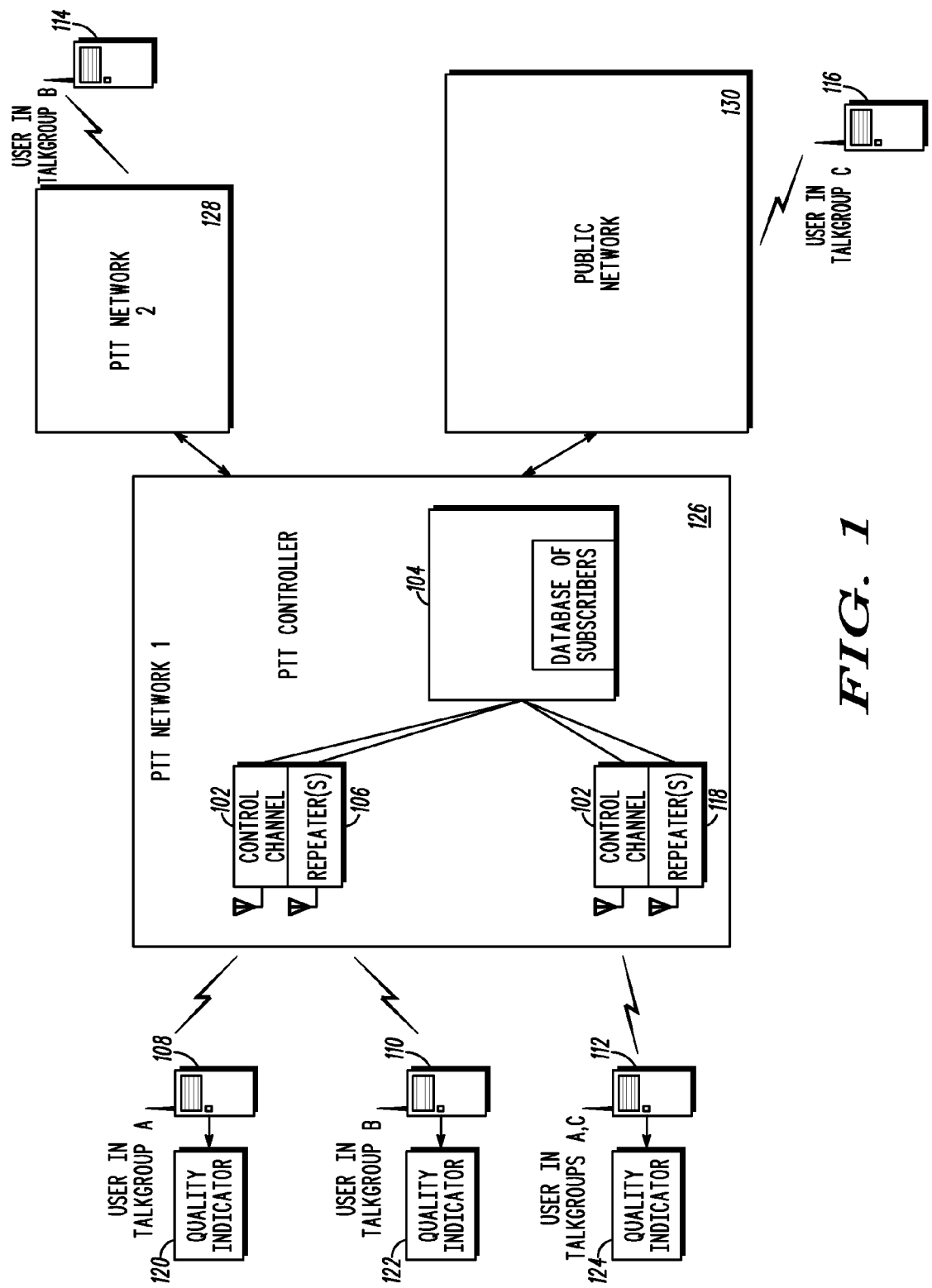
FIG. 1 is a block diagram illustrating a typical radio communication network comprising a private PTT network in accordance with an embodiment of the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

FIG. 1 is a block diagram of an exemplary private Push To Talk (PTT) network 100. The subscriber units 108, 110, 112 which are a part of the private PTT network 100 communicate over control channel 102 with a central resource, such as a PTT controller 104, in order to receive status and control information from the central resource. The subscriber units 108, 110, 112, 114, 116 are typically mobile or portable devices and are also known in the art as "radios." Further, subscriber units are characterized by a talkgroup identifier where a talkgroup is a group of subscriber units that share a radio frequency channel in the private PTT network 100. Subscriber units with the same talkgroup identifier are able to communicate with each other and are able to monitor conversations between users in the same talkgroup whereas subscriber units with different talkgroup identifiers are not able to communicate with each other. For example in FIG. 1, subscribers 108, 112 are in the same talkgroup, namely talkgroup A, and are able to communicate with each other and monitor conversations in talkgroup A whereas subscribers 110, 114 are in talkgroup B and are not able to communicate with subscribers 108, 112 or monitor conversations in talkgroup A.

The PTT controller 104 acts as the system coordinator and is responsible for assigning subscriber units 108, 110, 112 to different repeaters 106, 118 (also known as channels) so that they may communicate amongst each other. Each repeater 106, 118 has an associated control channel 102 where the associated control channel may be on a unique frequency or similar frequency. The PTT controller 104 is also responsible for knowing where each of the subscriber units are located (i.e. what voice channel and/or what site) and for controlling other features typically found in a modern trunked communication system (e.g. handling phone patches, coordinating groups of radios in emergency situations, etc.).

Further, the PTT controller 104 may have a database for keeping track of the subscribers and have information such as IDs, talkgroup identifiers, and site location. The database may contain information of subscriber unit 108 such as the subscriber unit's ID, that subscriber unit 108 is in talkgroup A, and that subscriber unit 108 is associated with repeater 106. Further, the information in the database may be updated as the subscriber units 108, 110, 112 change talkgroups and move in the private PTT network 100. Further yet, the typical PTT controller 104 includes a main processing unit such as a computer with appropriate control software that controls the operation of controller 104.

Further, since the PTT controller 104 has knowledge of talkgroups, the PTT controller 104 also has knowledge of whether a given talkgroup spans a plurality of networks. For example in FIG. 1, talkgroups B and C span a plurality of networks. Namely, talkgroup B comprises subscriber units 110, 114 where subscriber unit 110 is associated with private PTT network 126 and subscriber unit 114 is associated with private PTT network 128. Talkgroup C also spans a plurality of networks. Namely, talkgroup C comprises subscriber units 112, 116 where subscriber unit 112 is associated with private PTT network 126 and subscriber unit 116 is associated with public network 130. The PTT Controller 104 also has knowledge of whether subscriber unit 108 of talkgroup A is assigned to a repeater, e.g. repeater 106, that is accessed by means that introduce high delay. For example, means such as via geosynchronous satellite or undersea cable introduce higher delays than are typical when a direct communication link to a repeater, e.g. repeater 118, is available.

Communications between the subscriber units 108, 110, 112 and the PTT controller 104 can be of two directions, inbound and outbound. The signals that are sent from the PTT controller 104 to the subscriber units 108, 110, 112 over the control channel 102 are typically called outbound signaling communications. The control signals going from subscriber units 108, 110, 112 to the PTT controller 104 are called inbound signaling communications. Outbound signaling communications inform the subscriber units 108, 110, 112 of the expected level of quality during a talkgroup call and inform subscriber units 108, 110, 112 of the assigned voice channel, e.g. repeater 106, for the talkgroup call. Inbound signaling communications inform the PTT controller 104 of subscriber units 108, 110, 112 that which to participate in a talkgroup call.

An example of a typical trunked communication begins when a subscriber unit (e.g. 108) enters a repeater (e.g. 106) coverage area. After entering a repeater coverage area, the subscriber unit sends an affiliation message to the PTT controller 104. In an exemplary embodiment, the affiliation message includes information about which talkgroup(s) the subscriber unit belongs to, e.g. for subscriber unit 108, subscriber unit 108 is affiliated with talkgroup A. Once the PTT controller 104 receives the affiliation message, the PTT controller 104 updates a database with information about the subscriber unit. Then, the PTT controller sends a response as an over the air message with information as to the expected level of quality for communications amongst the affiliated talkgroup. In response, the subscriber unit provides an indicator to the user of the expected level of quality for the affiliated talkgroup.

In addition, the subscriber unit may initiate a communication by pressing PTT (Push To Talk) which sends a request for a voice channel 106 to the PTT controller 104. In an exemplary embodiment, the request includes information about which talkgroup the subscriber unit has selected, e.g. for subscriber unit 108, talkgroup A has been selected. Once the request is received at the PTT controller 104, the PTT controller 104 registers the subscriber unit with the repeater site by assigning a voice channel (e.g. voice channel on repeater 106) to the subscriber unit 108 and by updating the database of subscribers with information about the subscriber unit 108. The PTT controller 104 sends an acknowledgement and an over-the-air message to the subscriber unit 108 with information as to the expected level of quality for the talkgroup call. In response to the received messages, the subscriber unit provides an indicator to the user of the expected level of quality for the talkgroup call.

Further, as the subscriber unit moves in the private PTT network 126, the PTT controller 104 may update the database with information about the subscriber unit and the talkgroup that the subscriber unit has selected. For example, if subscriber unit 108 moves from coverage in the private PTT network 126 where coverage is provided by repeater 106 to where coverage is provided by repeater 118, the database 116 is updated with this new information. Another example, if subscriber unit 114 moves from coverage in the private PTT network 128 to where coverage is provided by public network 130, the database may be updated with this new information. Also, if the subscriber unit 108 changes talkgroups, for example from talkgroup A to talkgroup B, then the database may also be updated with this new information. Such a change is important because talkgroup A is within the PTT network 126 and talkgroup B spans a plurality of networks, namely PTT network 126 and PTT network 128.

An exemplary embodiment of the present invention provides an indicator on the subscriber unit, such as 108, 110, 112, to provide a sign about the expected level of quality for the talkgroup call. The indicator may be audible or visual. For example, if the talkgroup call is within one PTT network, the subscriber unit 108 may inform the user by playing an audible tone. Further, the indicator may be programmed where a given expected level of quality may be indicated by a preprogrammed preference, such as a ring tone which indicates an expected level of quality that is normal for a private PTT network where normal may indicate that the talkgroup call is within one PTT network, such as PTT network 126. For example, ring tone "one" may indicate that the talkgroup call is within the PTT network 126 and ring tone "two" may indicate that the talkgroup call spans a plurality of networks. For example in FIG. 1, ring tone "one" may inform a user of subscriber unit 108 that the selected talkgroup, namely talkgroup A, has an expected level of quality that is normal since the talkgroup is within PTT network 126. For example in FIG. 1, ring tone "two" may inform a user of subscriber unit 110 that the selected talkgroup, namely talkgroup B, has an expected level of quality that is something less than normal since the talkgroup spans a plurality of networks, namely PTT networks 126, 128. Such information may inform the user of subscriber unit 110 to be patient if there is a delay in the communications.

Further, the indicator may be programmed where a given expected level of quality may be indicated by a preprogrammed preference, such as a light which indicates an expected level of quality that is normal for a private PTT network where normal may indicate that the talkgroup call is within one PTT network, such as PTT network 126. For example, an "on" light indicates that the talkgroup call is within the PTT network 126. For example in FIG. 1, there may be an LED visual indicator 120 that shows a user of subscriber unit 108 that the selected talkgroup, namely talkgroup A, has an expected level of quality that is normal since the talkgroup is within PTT network 126. Another example in FIG. 1, there may be an LED visual indicator 124 that shows a user of subscriber unit 112 that selecting talkgroup C spans a plurality of networks, namely PTT network 126 and public network 130. Yet another example in FIG. 1, there may be an indicator 122 that shows a user of subscriber unit 110 that selecting talkgroup B spans a plurality of networks, namely PTT network 126 and PTT network 128. Such information may inform the user of subscriber units 110 and 112 to be patient if there is a delay in the communications.

In an exemplary embodiment, the visual indicator that is provided to a user of the subscriber unit is updated as the subscriber unit moves in the private PTT network 126, in addition to be provided in response to a request for a talkgroup call. For example, as the subscriber unit moves in the private PTT network 126, the subscriber unit may update the visual indicator with the latest expected level of quality information that is sent from the PTT controller 104. For example, if subscriber unit 108 moves from coverage in the private PTT network 126 where coverage is provided by repeater 106 to where coverage is provided by repeater 118, the visual indicator may change to reflect the expected level of quality that is associated with repeater 118. For example, when subscriber unit 114 in PTT network 128 affiliates to talkgroup B, the PTT controller 104 may update the visual indicator for subscriber unit 110 to indicate that calls to the talkgroup may span a plurality of networks.

There are a number of variations of the indicator that are within the scope of the present invention. One variation is an indicator that displays a number indicating a level of the expected level of quality. For example, the number '1' may indicate an expected high quality and the number '2' may indicate an expected quality which is lower than '1.' Another variation is to allow for a user programming of the indicator. For example, the subscriber unit may be programmed with custom ring tones to indicate the expected level of quality for the talkgroup call.

Figure 2:
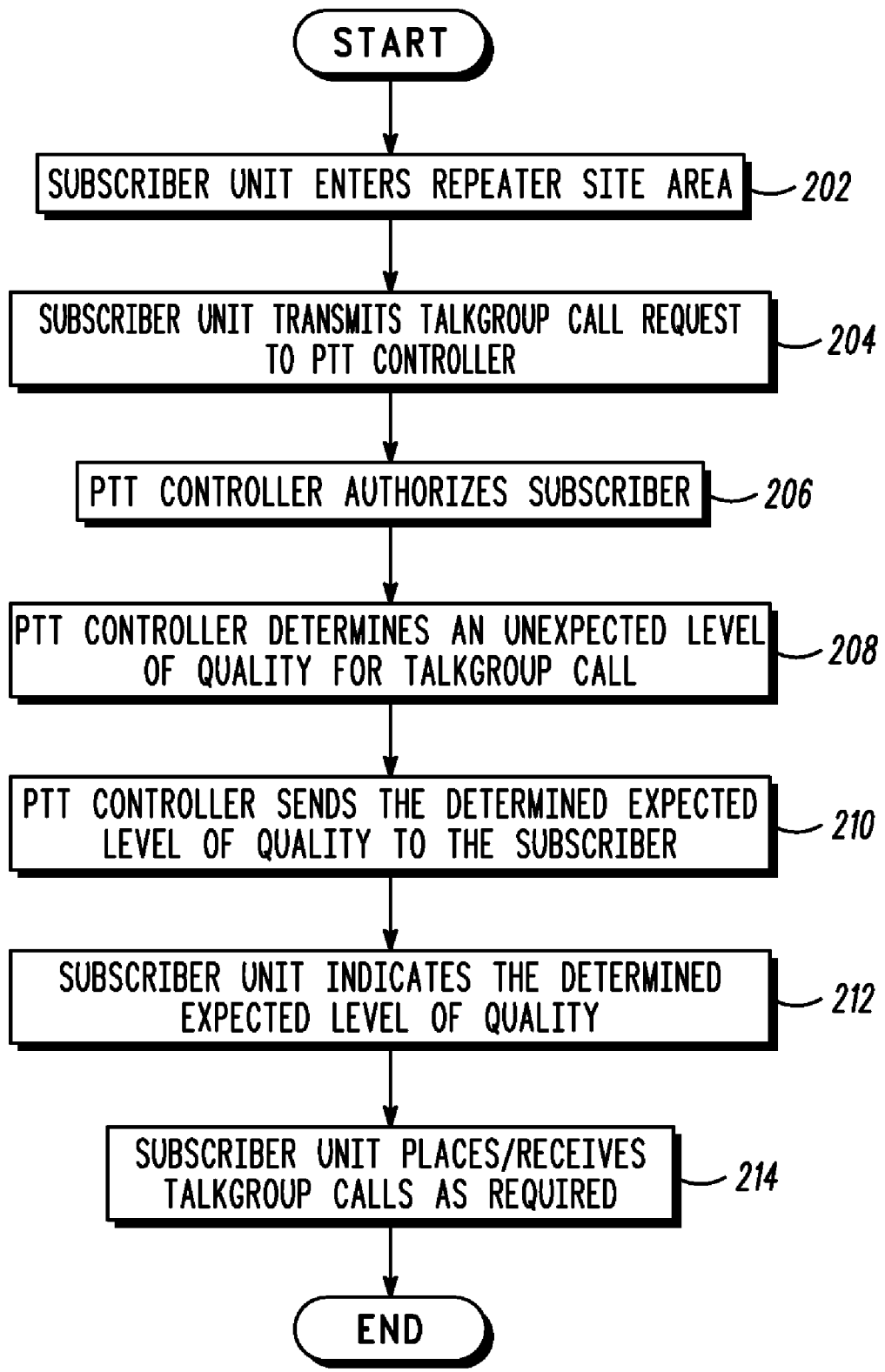
FIG. 2 is a flow diagram illustrating the method for indicating an expected level of quality for a talkgroup call in a private PTT network in accordance with an embodiment of the invention.

Referring now to FIG. 2, a flow diagram showing the steps taken by one of the subscriber units 108, 110, 112 in accordance with an exemplary embodiment of the invention is shown when the subscriber unit affiliates with a repeater site. In step 202, the subscriber unit (for example a subscriber unit in talkgroup "A") enters a repeater site area (for example repeater 106) and sends an affiliation message to the PTT controller 104 (Step 204). In one embodiment, the affiliation message comprises a unit id and a talkgroup id. This information comes to the PTT controller 104 as an inbound signaling communication. The information is then used by the PTT controller 104 to update a database of subscribers which stores information on all the subscriber units in the system 100, their current talkgroup affiliations, and the systems associated with those talkgroups. An automatic affiliation routine may also be performed by the subscriber units when they leave a service area, leave a talkgroup, or leave a repeater site. In step 206, the PTT controller 104 authorizes the subscriber. In step 208, the PTT controller 104 determines whether the affiliated talkgroup spans a plurality of networks and an expected level of quality for the affiliated talkgroup. In one embodiment, the determination is made by the PTT controller 104 referring to the database and checking whether the subscriber units associated with the affiliated talkgroup are associated with other networks. For example, in one embodiment, the database may associate talkgroup B with subscriber units 110 and 114 where subscriber unit 114 is associated with another network.

In step 210, the PTT controller 104 sends the subscriber unit an indication of the determined expected level of quality for the affiliated talkgroup. In step 212, the subscriber unit provides the determined expected level of the quality to a user of the subscriber unit. As mentioned above, the indication may be audio or visual in nature and may encompass the variations previously described herein. In an exemplary. As mentioned above, in an exemplary embodiment, a visual indicator may be provided to a user of the subscriber unit that indicates an expected level of quality information upon affiliation. In step 214, the subscriber unit places and/or receives talkgroup calls for the affiliated talkgroup as required.

Figure 3:
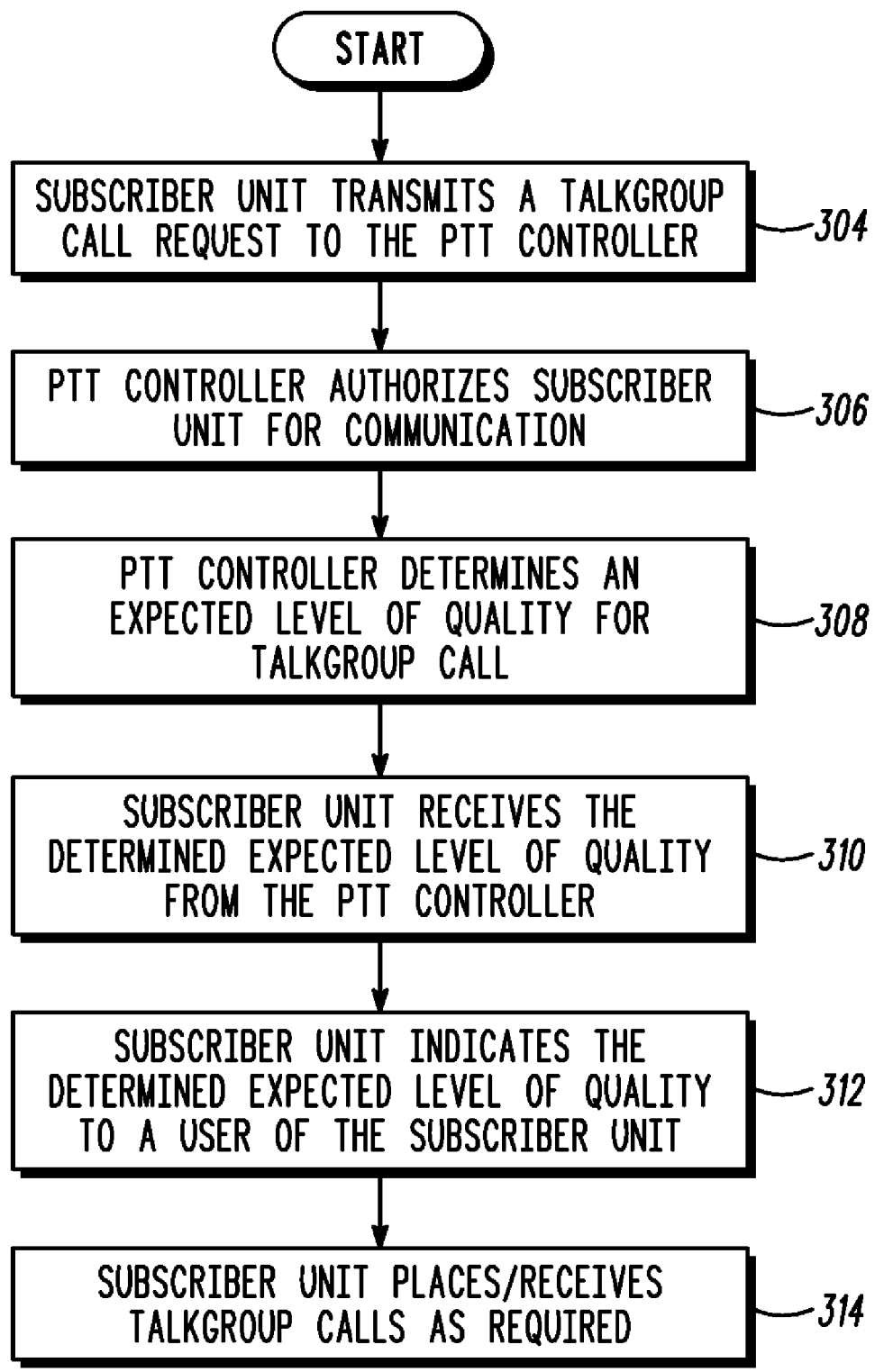
FIG. 3 is a flow diagram illustrating the method for indicating an expected level of quality for a talkgroup call in a private PTT network when a subscriber unit places a call request in accordance with an embodiment of the invention.

Referring now to FIG. 3, a flow diagram showing the steps taken by one of the subscriber units 108, 110, 112 in accordance with an exemplary embodiment of the invention is shown when the subscriber unit places a talkgroup call request. In step 304, the subscriber unit transmits a talkgroup call request to the PTT controller 104. In one embodiment, the talkgroup call request comprises a unit id and talkgroup id. This information comes to the PTT controller 104 as an inbound signaling communication. The information is then used by the PTT controller 104 to update a database of subscribers which stores information on all the subscriber units in the system 100, their current talkgroup affiliations, and the systems associated with those talkgroups. In one embodiment, the subscriber unit waits an internal programmable delay before transmitting the selected talkgroup to the PTT controller 104. Thus, the delay allows the user's talkgroup selection to be settled before the subscriber unit transmits the talkgroup call request to the PTT controller. In step 306, the PTT controller 104 authorizes the subscriber unit for communication.

In step 308, the PTT controller 104 determines whether the talkgroup call spans a plurality of networks. If the talkgroup call spans a plurality of networks, then the PTT controller 104 determines an expected level of quality for the talkgroup call. In one embodiment, the determination is made by the PTT controller 104 referring to the database and checking whether the subscriber units associated with the talkgroup call are affiliated with other networks. For example, in one embodiment, the database may associate talkgroup B with subscriber units 108 and 114 where subscriber unit 114 is affiliated with another network.

In step 310, the PTT controller 104 sends the subscriber unit an indication of the determined expected level of quality for the talkgroup call. In step 312, the subscriber unit provides the determined expected level of the quality to a user of the subscriber unit. As mentioned above, the indication may be audio or visual in nature and may encompass the variations previously described herein. Finally, in step 314, the subscriber unit places and/or receives talkgroup calls as required.

In summary, the present invention provides for indicating an expected level of quality in private PTT networks. It allows the user to know when a talkgroup call may be degraded. By having such knowledge, the user of the subscriber unit may be more tolerant of delay and lower quality system performance when the talkgroup call spans a plurality of networks.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

I claim:

1. A method for indicating an expected level of quality in a private Push To Talk (PTT) network, the method comprising the steps of:
   at a PTT controller of the private PTT network:
   receiving an affiliation message for a first subscriber unit of the private PTT network wherein the affiliation message identifies a talkgroup for the first subscriber unit, wherein the talkgroup is associated with at least one of the private PTT network, another PTT network, and a public network;

determining an expected level of quality for the affiliated talkgroup prior to a talkgroup call taking place for the affiliated talkgroup; and sending the determined expected level of quality to the subscriber unit.

2. The method of claim 1 wherein the step of determining further comprises the sub-step of referring to a database of the PTT controller to determine whether the affiliated talkgroup spans a plurality of networks.

3. The method of claim 1 wherein the step of sending further comprises the sub-step of transmitting a message to the subscriber unit comprising a numeric value indicating the determined expected level of quality.

4. The method of claim 1 further comprising the step of indicating the determined expected level of quality to a user of the subscriber unit.

5. The method of claim 1 further comprising the steps of:

receiving a talkgroup call request for the first subscriber unit of the private PTT network to communicate with a second subscriber unit wherein the second subscriber is associated with at least one of the private PTT network, another PTT network, and a public network;

authorizing the first subscriber unit to participate in a talkgroup call of the talkgroup call request;

determining an expected level of quality for the selected talkgroup call; and sending the determined expected level of quality to the subscriber unit.

6. The method of claim 5 wherein the step of determining further comprises the sub-step of referring to a database of the PTT controller to determine whether the talkgroup call spans a plurality of networks.

7. The method of claim 5 wherein the step of sending further comprises the sub-step of transmitting a message to the subscriber unit comprising a numeric value indicating the determined expected level of quality.

8. In a private Push To Talk (PTT) network having a PTT controller and a plurality of subscriber units affiliated with a talkgroup, a method for indicating an expected level of quality, the method comprising the steps of:

at a subscriber unit in the private PTT network:

sending an affiliation message by the subscriber unit to the PTT controller wherein the affiliation message identifies a talkgroup for the subscriber unit, wherein the talkgroup is associated with at least one of the private PTT network, another PTT network, and a public network;

receiving a message by the PTT controller with an expected level of quality for the affiliated talkgroup, wherein the expected level of quality is determined prior to a talkgroup call taking place for the affiliated talkgroup; and indicating the expected level of quality for the affiliated talkgroup to a user of the subscriber unit.

9. The method of claim 8 wherein the step of indicating further comprises the sub-step of displaying at the subscriber unit information on the expected level of quality.

10. The method of claim 8 wherein the information is a numeric value.

11. The method of claim 8 further comprising the steps of:

sending a talkgroup call request by the subscriber unit to the PTT controller;

receiving a message by the PTT controller with an expected level of quality for a talkgroup call of the talkgroup call request; and indicating the expected level of quality for the talkgroup call to a user of the subscriber unit.

12. The method of claim 11 wherein the step of indicating comprises either an audible or visual form.

13. The method of claim 11 wherein the step of indicating further comprises the sub-step of displaying at the subscriber unit information on the expected level of quality.

14. The method of claim 13 wherein the information is a numeric value.

15. The method of claim 13 wherein the information is an audible tone.

16. The method of claim 11 wherein the step of indicating is programmable by the user of the subscriber unit.

17. The method of claim 11 wherein the step of sending further comprises the step of delaying an amount of time before communicating a selected talkgroup to the PTT controller, whereby the amount of time is programmable.

18. A system for indicating an expected level of quality for a talkgroup call in a private Push To Talk (PTT) network comprising:

a receiver for receiving messages which communicate information about an expected level of quality for a talkgroup call in the private PTT network, wherein the expected level of quality is determined before placing the talkgroup call;

a selector which chooses a talkgroup of the talkgroup call by locking onto a specific frequency in the private PTT network;

a transmitter to communicate the selected talkgroup to a PTT controller of the private PTT network; and an indicator which signals the information about the expected level of quality to a user of the system, wherein the operation of the receiver, the selector, the transmitter, and the indicator are controlled by a processor of the processor.

19. The system of claim 18 wherein the indicator further comprises a display which conveys to a user of the system the information about the expected level of quality for the talkgroup call in visual form.

20. The system of claim 18 wherein the indicator further comprises a speaker which conveys to a user of the system the information about the expected level of quality for the talkgroup call in audible form.

* * * * *

UNITED STATES PATENT AND TRADEMARK OFFICE
CERTIFICATE OF CORRECTION

| | | |
|---|---|---|
| PATENT NO. | : 7,353,038 B2 | Page 1 of 1 |
| APPLICATION NO. | : 11/092236 | |
| DATED | : April 1, 2008 | |
| INVENTOR(S) | : Mathis | |

It is certified that error appears in the above-identified patent and that said Letters Patent is hereby corrected as shown below:

ON THE FACE PAGE

On the Face Page, in Field (73), under "Assignee", in Column 1, Line 1, delete "Mototola," and insert -- Motorola, --, therefor.

On the Face Page, in Field (56), under "U.S. PATENT DOCUMENTS", in Column 2, Line 2, delete "Aravamuden" and insert -- Aravamudan --, therefor.

IN THE SPECIFICATION

In Column 5, Line 48, after "described herein." delete "In an exemplary.".

Signed and Sealed this

Thirteenth Day of September, 2011

David J. Kappos
*Director of the United States Patent and Trademark Office*